(12) United States Patent
Slaughter et al.

(10) Patent No.: US 7,147,448 B2
(45) Date of Patent: Dec. 12, 2006

(54) APPARATUS AND METHOD FOR DISTRIBUTING A SUBSTANCE

(75) Inventors: Steve Slaughter, Palmdale, CA (US); John C. Fish, Santa Clarita, CA (US); Susan N. Clarkson, Newhall, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 424 days.

(21) Appl. No.: 10/641,683

(22) Filed: Aug. 14, 2003

(65) Prior Publication Data

US 2004/0032062 A1 Feb. 19, 2004

Related U.S. Application Data

(63) Continuation-in-part of application No. 09/919,128, filed on Aug. 1, 2001, now Pat. No. 6,630,095.

(51) Int. Cl.
*B29C 70/44* (2006.01)
(52) U.S. Cl. .................... 425/129.1; 425/389
(58) Field of Classification Search ............ 425/129.1, 425/389
See application file for complete search history.

(56) References Cited

U.S. PATENT DOCUMENTS

| | | | | |
|---|---|---|---|---|
| 4,902,215 A | * | 2/1990 | Seemann, III | 425/406 |
| 4,942,013 A | * | 7/1990 | Palmer et al. | 264/511 |
| 5,576,030 A | * | 11/1996 | Hooper | 425/112 |
| 6,048,488 A | * | 4/2000 | Fink et al. | 264/510 |
| 6,383,428 B1 | * | 5/2002 | Ellison | 264/108 |
| 6,406,660 B1 | * | 6/2002 | Spurgeon | 264/510 |
| 6,508,974 B1 | * | 1/2003 | Loving | 264/510 |
| 6,586,054 B1 | * | 7/2003 | Walsh | 427/430.1 |
| 6,627,142 B1 | * | 9/2003 | Slaughter et al. | 264/510 |
| 6,630,095 B1 | * | 10/2003 | Slaughter et al. | 264/510 |
| 6,964,561 B1 | * | 11/2005 | Louderback et al. | 425/129.1 |
| 2003/0102604 A1 | * | 6/2003 | Mack et al. | 264/511 |
| 2005/0040553 A1 | * | 2/2005 | Slaughter et al. | 264/40.1 |

FOREIGN PATENT DOCUMENTS

GB 2360483 A * 9/2001

* cited by examiner

*Primary Examiner*—Robert B. Davis
(74) *Attorney, Agent, or Firm*—Koestner Bertani LLP; Mary Jo Bertani

(57) ABSTRACT

A system for controlling the deposit of liquid, gaseous, and/or particulate solid substances from a staging medium and method of making same is provided. The system comprises a distribution medium for receiving substances, and a containment layer adjacent to the substance distribution medium. The containment layer substantially prevents substance from entering the deposit area until the distribution medium is substantially filled with substance, thereby helping to prevent uneven deposits of the substance.

37 Claims, 3 Drawing Sheets

APPARATUS AND METHOD FOR DISTRIBUTING A SUBSTANCE

CROSS-REFERENCE TO RELATED APPLICATIONS

This application is a continuation-in-part of patent application Ser. No. 09/919,128, filed Aug. 1, 2001 and now U.S. Pat. No. 6,630,095, entitled "Method for Making Composite Structures," having Steve Slaughter and John C. Fish as inventors, which application is assigned to same assignee as the present application, and is hereby incorporated by reference.

BACKGROUND

Description of Related Art

Generally, vacuum assisted resin transfer molding (VARTM) processes include laying up layers of a material of any unimpregnated fiber and/or fabric on top of a mold. A vacuum bag is placed about the lay-up and sealed to the mold. A peel ply may be placed on top of the lay-up and between the layers and mold surface to insure that the vacuum bag can be removed from the completed part and that the part can be removed from the mold. Resin is introduced into the vacuum bag, while a vacuum is drawn from beneath the lay-up. This causes the resin to flow through the lay-up. Thereafter, the resin flow is terminated and the resin in the assembly is cured. This may require that the resin be heated to curing temperature. To insure even distribution of resin into the lay-up, a resin distribution medium is placed on top of the lay-up, which is designed to cause the resin to evenly distribute there across eliminating resin-starved areas.

Many types of resin distribution have been proposed. Some inventions describe the use of a perforated film between the lay-up and vacuum bag. Resin is fed from the top through the vacuum bag, through the perforated film and into the lay-up. A spring is located at the periphery of the lay-up, but under the perforated film. The spring is coupled to a vacuum line, thus providing a channel such that resin can be more readily transferred into the lay-up. This reference is of interest for disclosing the use of a perforated film and the use of a spring to provide a channel to the perforated film. However, a special perforated film is required and there is still the problem of insuring that the resin reaches all parts of the perforated film. Other inventions use a wire mesh as a distribution medium in a vacuum assisted molding process. However, a wire mesh may not necessarily be made to conform to a complex contoured part. Furthermore, an open mesh may allow resin to flow too freely into the lay-up prior to the wire mesh becoming filled with resin, thus filling the lay-up near the inlet tube and creating resin starved area further away from the inlet tube.

Other techniques use channels placed on the lay-up that act as resin distribution paths and become reinforcements on the finished part. This technique is generally not used on parts that do not require reinforcement.

In general terms, the design of the distribution medium includes two parts: spaced apart lines and an array of raised pillars. In detail, the distribution medium can be a criss-crossed pattern of mono-filaments with raised segments at the intersection of the mono-filaments; a series of spaced apart strips forming a grid structure; or a knitted cloth with raised segments being areas of increased bulk. A central conduit in the form of a spring is positioned over the peel ply and is in communication with the resin inlet port and acts as a central distribution line. Other techniques use the distribution mediums on either side of the lay-up. These distribution mediums are specialized products and may unduly raise fabrication costs.

A method also exists wherein multiple layers of fibrous reinforcements are assembled into a desired configuration on a support tool, with one of the layers of fibrous reinforcement defining a resin carrier fabric (distribution medium) that extends beyond the periphery of the other layers. The layers of fibrous reinforcements and tool are covered with a flexible layer to form an envelope that encapsulates the fibrous reinforcements. A vacuum source evacuates air from the envelope. Resin is introduced into the envelope and fibrous reinforcements by using a flow path through the one layer used as the resin carrier layer. After the fibrous reinforcements have been impregnated, the resin flow is terminated and the resin is cured. What is really happening is that an additional fibrous layer is added to the fiber reinforcements making up the part that extends there beyond and over flow channels at the periphery of the tool. In one embodiment, this extra fibrous layer is separated from the "part" by a release or peel ply. In a second embodiment, the fibrous layer is integral with the part. This distribution medium is designed for use in a process where the resin is introduced from the peripheral edges of the lay-up.

A system also exists wherein a pair of preforms with different permeabilities are installed in a mold separated by a separation layer. Different resins are injected into each preform by the vacuum assisted resin transfer method. The key to this process is the use of a separation layer having permeability lower than the permeability of either of the fiber preforms.

Another invention uses a dual bag within a bag concept. Both bags are sealed to the mold surface with the lay-up within the inner bag. The outer bag incorporates protrusions. A vacuum is first drawn from between the inner and outer bag. This forces the protrusions into the inner bag creating a pattern of channels. A vacuum is then drawn from between the mold surface and inner bag. Resin is then flowed into the lay-up through the channels. Thus the inner bag acts as a resin distribution medium. This apparatus requires a custom vacuum bag, which may raise fabrication costs.

Other devises in the general area of substance distribution provide systems wherein substance held in a reservoir is released to the surface of an applicator by rupturing a substantially fluid-impervious barrier layer in an interior cavity. The pressure provided to rupture the barrier is provided by manually squeezing and the material is then spread onto a third surface with the applicator. The apparatus does not contemplate a direct flow of material through the ruptured barrier onto the ultimate surface or build-up of pressure through a change in atmospheric pressure in the filling apparatus or through the weight of accumulating material.

SUMMARY

An apparatus for controlling the flow of liquid, gaseous, or particulate solid substances from a substance distribution system and method for making same is provided. In some embodiments, a system for controlling the flow of a substance includes a distribution medium for receiving the substance, and a containment layer adjacent to the distribution medium. The containment layer substantially prevents the substance from flowing until the distribution medium is substantially filled with substance.

In an alternate embodiment, a method for controlling the flow of a substance includes placing a distribution medium adjacent to a containment layer; introducing the substance into the distribution medium; configuring the containment layer to substantially prevent the substance from flowing from the distribution medium until the substance distribution medium is substantially filled with substance; and reconfiguring the containment layer to allow the substance to flow to an intended destination.

In still another embodiment, a resin distribution system includes a resin distribution medium for receiving the resin. The resin distribution medium includes a first principle side facing the resin inflow and a second principle side facing the mold surface. A resin containment layer is positioned adjacent to the resin distribution medium. The resin containment layer is configured to substantially prevent the resin from entering the lay-up until the resin distribution medium is substantially filled with resin.

BRIEF DESCRIPTION OF THE DRAWINGS

Embodiments of the present invention may be better understood, and their numerous objects, features, and advantages made apparent to those skilled in the art by referencing the accompanying drawings. The use of the same reference symbols in different drawings indicates similar or identical items.

DETAILED DESCRIPTION

Figure 1A:
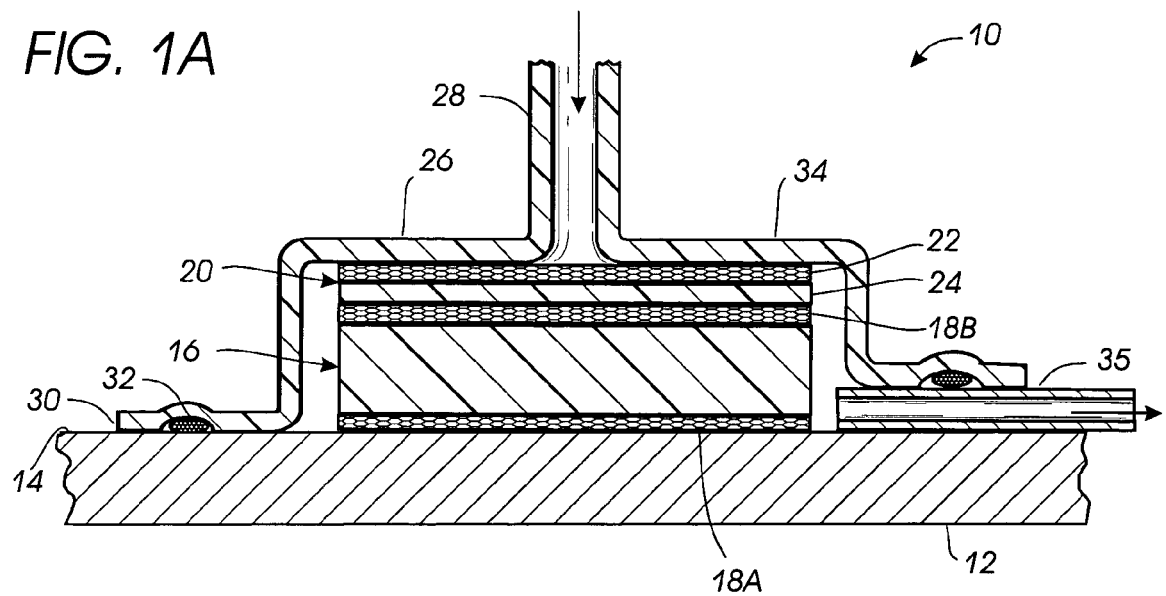
FIG. 1A is a cross-sectional view of an embodiment of a system for distributing layers of one or more substances.
Figure 2:
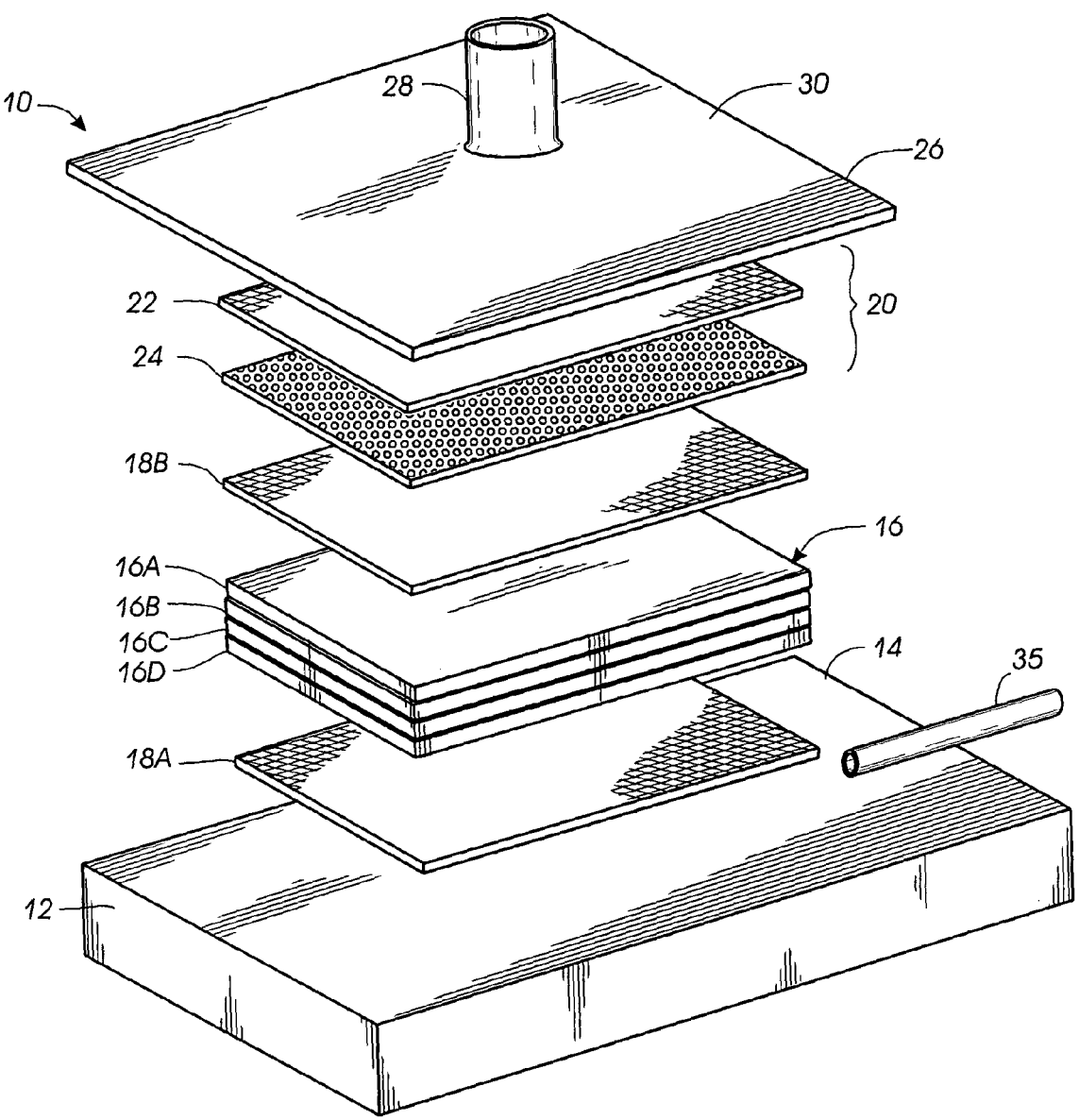
FIG. 2 is an exploded perspective view of the system illustrated in FIG. 1A.

Referring to FIGS. 1A and 2, an embodiment of a distribution system 10 for controlling and distributing the flow of liquid, gaseous, and particulate solid substances is shown including distribution medium 22 and containment layer 24. Distribution medium 22 includes a first principle side facing an inflow of substance and a second principle side facing containment layer 24. Containment layer 24 is designed to substantially prevent substance from flowing to an intended destination until distribution medium 22 is substantially filled with substance.

In some embodiments, distribution system 10 can be utilized to fabricate composite materials. System 10 includes mold 12 and mold surface 14. For purposes of illustration a flat mold surface 14 is shown, however, mold surface 14 can be curved, can include a moving conveyor belt, or any other surface for evenly distributing resin over one or more layers of material 16A through 16D to form lay-up 16. In some embodiments, peel ply layers 18A, 18B can be positioned adjacent one or both of the outer sides of lay-up 16. Peel ply layers 18A, 18B are typically made of a porous material to allow resin to easily pass through without bonding to mold surface 14 or containment layer 24 as resin-impregnated lay-up 16 equilibrates into its final state. In other embodiments, peel ply layers 18A, 18B may not be included.

In some embodiments, outer sheet 26, also referred to as a vacuum bag, includes inlet port 28 positioned adjacent distribution system 10 and sealed at its marginal edges 30 to mold surface 14 by sealant tape 32 or other suitable means to form chamber 34. An example of a sealant tape 32 that can be utilized is Tacky Tape™ manufactured by Schnee-Moorehead, Irving, Tex. Vacuum outlet port 35 can be installed between mold surface 14 and marginal edge 30 of outer sheet 26 for drawing a vacuum in chamber 34.

In some embodiments, substance enters inlet port 28, while a vacuum is drawn from outlet port 35. The vacuum causes outer sheet 26 to collapse down around distribution medium 22. Without distribution medium 22, it would be difficult to evenly distribute resin over lay-up 16, and substance starved areas or even voids could be created in the cured lay-up 16. With substance distribution medium 22, however, resin can flow evenly lay-up 16, greatly reducing the chance of forming voids and the like in the final product.

Figure 1B:
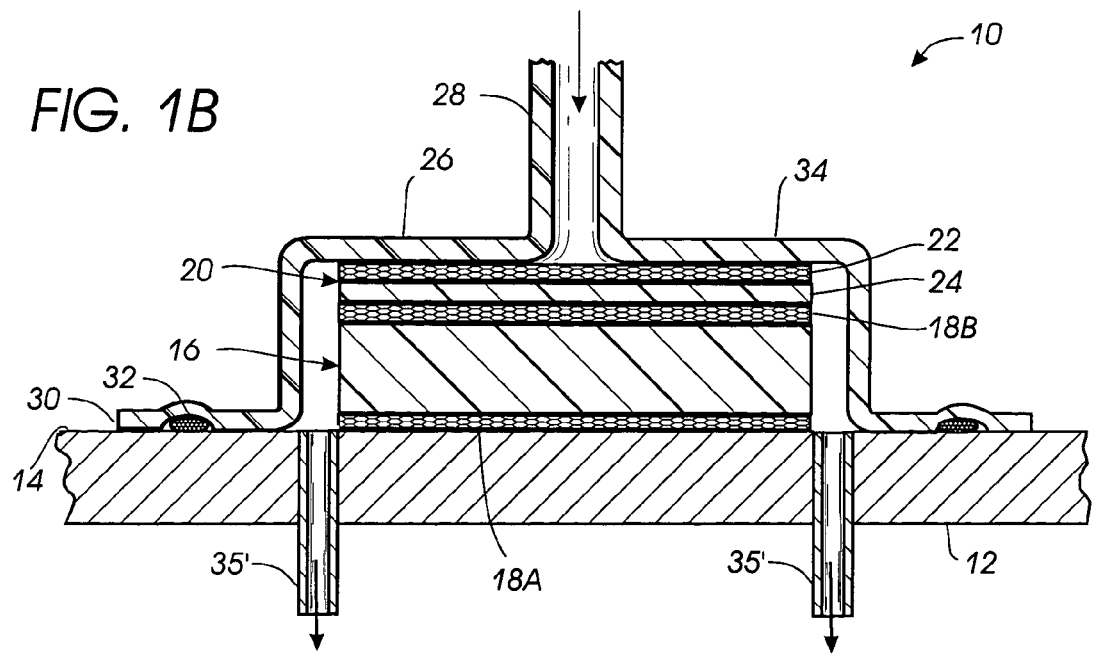
FIG. 1B is a cross-sectional view of another embodiment of a system for ting layers of one or more substances.

FIG. 1B shows another embodiment of distribution system 10 that include vacuum outlet ports 35' in mold 12. Outlet ports 35' can be positioned in one or more locations in mold 12. Portions of outlet ports 35' extending from mold 12 can be fitted to a vacuum source to draw outer sheet 26 to collapse around distribution medium 22 and lay-up 16. In some embodiments, one or more outlet ports 35' are positioned around the periphery of lay-up 16 in areas where there are likely to be gaps between lay-up and outer sheet 26. As many inlet ports 28 and outlet ports 35' as necessary can be utilized, thereby enabling distribution system 10 to be utilized to fabricate components in a variety of shapes and sizes. Further, a combination of one or more outlet ports 35 (FIG. 1A) and outlet ports 35' can be utilized in the same distribution system 10.

Lay-up 16 can comprise one or more layers of material, such as woven fiberglass, graphite or other composite reinforcement material. Peel plies 18A and 18B can be made of a material such as coated fiberglass, which is porous to resin so that resin can easily pass through without bonding to mold surface 14 or containment layer 24 as the resin cures. A suitable peel ply material is Release Ease 234TFP, manufactured by Airtech Products, Incorporated, Huntington Beach, Calif.

In some embodiments of distribution system 10, a material suitable for use as outer sheet 26 is impregnated Nylon, which can be obtained from numerous suppliers such as the previously mentioned Airtech Products. When the substance being distributed is resin, distribution medium 22 can be comprised of any suitable material. For example, a knitted mono-filament UV stabilized high density polyethylene can used as distribution medium 22, such as commercially available SolarGuard™ manufactured by Roxford Fordell Company, Greenville, S.C. Anther suitable product for distribution medium 22 is Colbond 7004 manufactured by Colbond, Incorporated, Enka, N.C. Colbond 7004 is a random orientated, heat fused mono-filament material.

Figure 3:
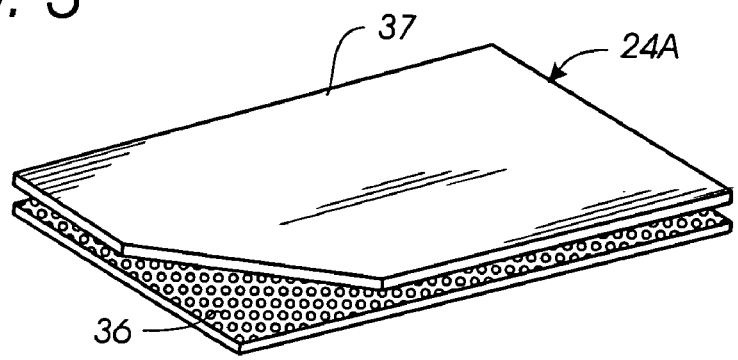
FIG. 3 is an enlarged perspective view of an embodiment of the containment layer, wherein the containment layer is made of material that melts.

Referring to FIGS. 1A and 3, in other embodiments, temperature sensitive containment layer 24A has a melting point such that containment layer 24A dissolves or melts after substance is at least partially distributed in distribution medium 22. Once containment layer 24A melts, the substance can flow to its intended destination. Distribution system 10 can include means for applying heat to temperature sensitive containment layer 24A. Heating can be done either directly by means such as raising the ambient temperature, blowing heated air, conducting electricity through a metallic frame, chemical reaction, or other suitable means. Heat can also be applied to substance containment layer 24A by heating the substance before, during, or after the substance contacts containment layer 24A. Other materials that dissolve can be used for containment layer 24A in addition to, or instead of, containment layers 24A that dissolve when heated.

In some embodiments, a temperature sensitive containment layer 24A includes a meltable substance layer 36 and porous veil material 37. An example of a suitable material for temperature sensitive containment layer 24A for use with resin is Blue Max Tak Tu on Reemay (a polyester nonwoven veil), manufactured by The Blue Max Company, Anaheim, Calif. The Blue Max Tak Tu material is a low temperature melting resin 36 that is applied to a porous veil material 37.

Figure 4:
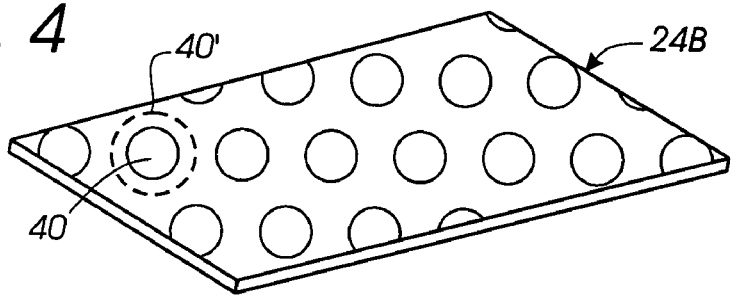
FIG. 4 is an enlarged perspective view of another embodiment of the containment layer, wherein the containment layer is made of a perforated heat shrinkable material.

Referring to FIG. 4, another embodiment of containment layer 24B includes a plurality of holes 40 in a heat shrinkable material. Holes 40 are a size such that substance will not readily flow there through at ambient temperatures. Upon heating, the material of containment layer 24B will shrink, causing holes 40 to increase in size, shown in dotted lines and indicated by numeral 40', allowing substance to flow from substance distribution medium 22. A suitable heat shrinkable material for use with resin substances includes Intercept Shrink film manufactured by FPM, Incorporated, Brownstone, Me.

Figure 5:
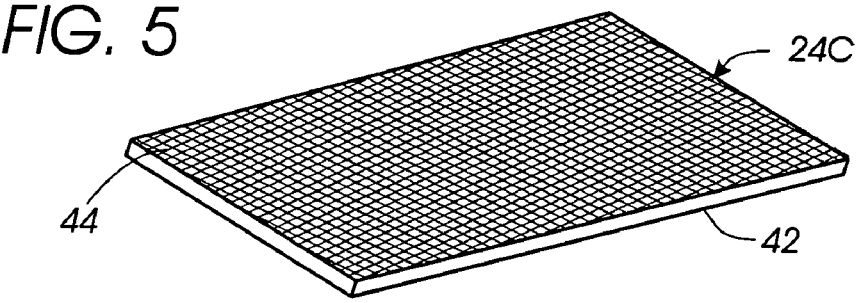
FIG. 5 is an enlarged perspective view of another embodiment of the containment layer, wherein the containment layer is made of a highly perforated or highly embossed, frangible material.
Figure 5A:
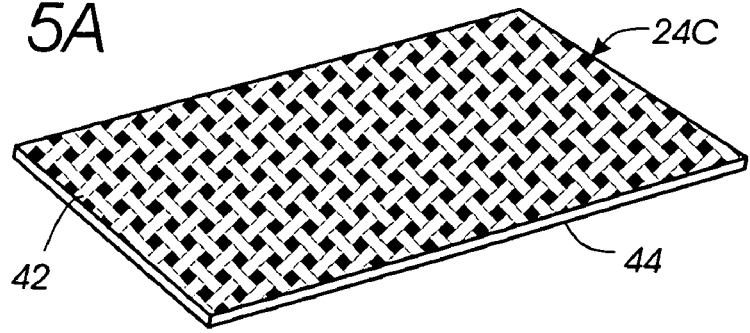
FIG. 5A is partial enlarged view of FIG. 5.

Referring to FIGS. 1, 5 and 5A, in some embodiments, containment layer 24C is a porous film 42 includes a plurality of holes or very closely spaced perforations 44. The size of the perforations is selected to prevent or greatly reduce substance flow through substance containment layer 24C. Holes 44 having a size such that substance will not flow there through when a vacuum is drawn to outlet port 35 at a first rate and will flow there through when a vacuum is drawn from outlet port 35 at a higher second rate. Calculating the size of holes 44 in substance containment layer 24C can be accomplished as follows. For a layer of substance above substance containment layer 24C, the hydrostatic pressure at the layer is by the equation:

$$PH=\rho hg$$

Where: ρ is the density of the substance,
h is the depth (height) of the substance, and
g is the gravitational constant The "excess pressure" developed by the surface tension of the substance and the openings (perforations) in substance containment layer 24C can be expressed as:

$$PE=2\ T/d$$

where T is the surface tension of the substance and
d is the perforation diameter (assumes circular perforation)

The governing equation for substance containment sets the hydrostatic pressure equal to the excess pressure:

$$\rho hg=2\ T/d$$

Properties of a typical resin, such as Derakane 411 C-50 resin by Dow Chemical Company, Midland, Mich. are:

$$\rho=1265\ \text{kg}/m3$$

$$T=0.032\ \text{Newtons/meter}$$

The maximum perforation size that overcomes the hydrostatic pressure is then:

$$d=2\ T/((hg)=2(0.032)/(1265\times h\times 9.8)$$

$$d=0.000005163/h\ \text{meters.}$$

Using a typical thickness of a substance distribution medium, where the substance is resin, the substance height becomes 0.00635 m (0.25 in) and the maximum perforation size is:

$$d_{max}=8.13\times 10^{-4}\ \text{meters (0.032 in).}$$

For thicker substance distribution mediums, the maximum perforation size will decrease. Perforations larger than this maximum value may not contain the substance during infusion. Similarly, the minimum perforation size can be estimated by equating the excess pressure to the sum of the hydrostatic pressure and the vacuum pressure in the bagged assembly:

$$\rho hg+PV=2\ T/d$$

where PV will be on the order of one atmosphere. At sea level, PV is approximately 100 kiloPascals (kPa) and dominates the left side of the equation above. The minimum perforation size is then estimated by:

$$d_{min}=2\ T/PV=2(0.032)/(100\times 10^{3})$$

$$d_{min}=6.4\times 10^{-7}\ \text{meters}=2.5\times 10^{-5}\ \text{inches}$$

Perforations smaller than this minimum value may not permit substance to pass through the substance containment layer 24C under vacuum pressure. The substance containment layer 24C perforation size is then bounded by:

$$2.5\times 10^{-5}\ \text{inch}<d<0.032\ \text{inch}$$

A suitable material for containment layer 24C for use with resin substances is Easy Gardner Tree Wrap having round holes with a 0.015 inch diameter or Easy Gardner Weed Block with square holes of a similar size. Both of these materials are manufactured by Easy Gardner, Incorporated, Waco, Tex. This method of calculation can also be used to design the perforations for temperature sensitive containment layers 24B (FIG. 4).

In still other embodiments of distribution system 10 (FIG. 1), containment layer 24 can be comprised of a layer of perforated material including a plurality of embossed holes. Sufficient pressure can be applied to containment layer 24 to cause the perforations to release and allow the substance to flow once it is distributed in distribution layer 22. Distribution system 10 can be modified to include means for applying pressure to the substance in distribution layer 24 to induce tearing of the holes in containment layer 24. Such means include physically applying pressure to the substance, applying vacuum pressure, such as by drawing a vacuum on chamber 34, or other suitable means. Containment layer 24 can also be configured to tear upon application of sufficient weight of the substance. Distribution medium 22 can be configured to allow sufficient substance to accumulate to apply the required weight to containment layer 24.

Other embodiments include containment layer 24 fabricated from materials whose porosity properties change under application of different rates of vacuum, different rates of atmospheric pressure, and varying heat. Substances that can be distributed with distribution system 10 include any amounts of liquid, solid, and/or gaseous substances. Distribution layer 22 can be fabricated from any suitable material or combination of materials, and can include grids or other suitable openings to distribute the substance.

Various embodiments can include two or more distribution systems 10 that are configured to allow substances to be combined automatically at desired pre-selected time intervals, or upon application of means to at least partially remove containment layer 24 to allow the substance to flow toward its intended destination. For example, containment layer 24 in one distribution system 10 can be configured to release the substance when activated by an operator. The distributed substance can flow onto and chemically react with another substance in a second distribution system 10. Containment layer 24 can be configured to release the combined substances either manually or automatically once the chemical reaction is complete.

Distribution medium 22 can be configured to accumulate all or a portion of the substance to be distributed by increasing the depth of the grid, including side walls around the perimeter of distribution medium 22, or other suitable structure. Further, distribution system 10 can be oriented to allow substance to flow in any desired direction. Additionally, the substance can be forced to flow in any desired direction through the use pressure, pumps, or other suitable mechanism for inducing flow through distribution medium 22.

While the present disclosure describes various embodiments, these embodiments are to be understood as illustrative and do not limit the claim scope. Many variations, modifications, additions and improvements of the described embodiments are possible. For example, those having ordinary skill in the art will readily implement the structures and methods disclosed herein, and will understand that any process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. In the claims, unless otherwise indicated the article "a" is to refer to "one or more than one".

What is claimed:

1. A system for controlling the flow of a substance comprising:

a distribution medium for receiving the substance, and a containment layer adjacent to the distribution medium wherein the containment layer substantially prevents the substance from flowing until the distribution medium is substantially filled with substance, and the containment layer is selected from materials whose porosity changes under at least one of the group of: vacuum force, atmospheric pressure, and temperature.

2. The system as set forth in claim 1 further comprising:

a chamber for maintaining a differential pressure from the prevailing atmospheric pressure, and a source for developing such a differential pressure.

3. The system as set forth in claim 1, further comprising a heat source for applying heat to the containment layer.

4. The system as set forth in claim 3, wherein the heat source includes the substance being applied preheated to a specified temperature.

5. The system as set forth in claim 3 wherein the substance containment layer has a melting point such that the substance containment layer melts upon heating, allowing the substance to flow.

6. The system as set forth in claim 3 wherein the containment layer comprises a plurality of holes through a heat shrinkable material, the holes having a size such that substance will not readily flow there through at ambient temperatures and upon heating, the heat shrinkable material shrinks causing the holes to increase in size, allowing substance to flow from the distribution medium.

7. The system as set forth in claim 2 wherein the containment layer comprises a plurality of holes, the holes having a size such that substance will not flow there through when a vacuum is drawn to an outlet port at a first rate and will flow there through when a vacuum is drawn from the outlet port at a higher second rate.

8. The system as set forth in claim 1 wherein the containment layer comprises a layer of frangible material, the frangible material includes a plurality of partially perforated embossed holes which will release and allow the passage of substance upon application of sufficient pressure.

9. The system as set forth in claim 1, further comprising means to apply pressure to the substance while the substance is retained in the distribution medium.

10. The system as set forth in claim 1, wherein the weight of the substance provides sufficient force to rupture the containment layer to allow the substance to flow to an intended destination.

11. The system as set forth in claim 1, further comprising a peel ply layer positioned adjacent to the substance.

12. The system as set forth in claim 1, further comprising:

an outer sheet positioned around the distribution medium and the containment layer to form a chamber; and a vacuum outlet port positioned to draw a vacuum within the chamber.

13. The system as set forth in claim 12, further comprising:

a mold surface, wherein the vacuum outlet port extends through the mold surface.

14. The system as set forth in claim 12, wherein the vacuum outlet port extends externally from the outer sheet.

15. A resin distribution system comprising:

a resin distribution medium for receiving the resin, the resin distribution medium includes a first principle side facing the resin inflow and a second principle side facing the mold surface;

a resin containment layer adjacent to the resin distribution medium, wherein the resin containment layer is configured to substantially prevent the resin from entering the lay-up until the resin distribution medium is substantially filled with resin;

a mold surface;

an outer sheet placed over the lay-up, and over the resin distribution system, wherein the outer sheet's edges are sealed to the mold surface to form a chamber;

a resin inlet port in the outer sheet; and a vacuum outlet for drawing a vacuum in the chamber.

16. The system as set forth in claim 15 wherein the resin containment layer has a melting point such that the resin can be distributed into the resin distribution medium, and the resin containment layer melts upon heating of the resin.

17. The system as set forth in claim 15 wherein the resin containment layer comprises a plurality of holes through a heat shrinkable material, the size of the holes being such that resin will not readily flow there through at pre-selected temperatures and upon adjusting the temperature to another pre-selected value, the material shrinks causing the holes to increase in size, allowing resin to flow from the resin distribution medium.

18. The system as set forth in claim 15 wherein the resin containment layer comprises a plurality of holes there through, the holes having a size such that the resin will not flow there through when a vacuum is drawn to an outlet port at a first rate and will flow there through when a vacuum is drawn from the outlet port at a higher second rate.

19. The system as set forth in claim 15 wherein the resin containment layer comprises a layer of frangible material, the frangible material including a plurality of partially perforated embossed holes configured to rupture upon application of sufficient pressure to allow the passage of the resin.

20. The system as set forth in claim 19, further comprising means to apply pressure to the resin against the resin containment layer.

21. The system as set forth in claim 19, wherein the weight of the resin provides sufficient pressure to rupture the embossed holes.

22. The system as set forth in claim 15, further comprising a peel ply layer positioned adjacent to one side of the lay-up.

23. The system as set forth in claim 22 wherein the peel ply layer is made of a coated fiberglass material.

24. The system as set forth in claim 17 wherein the size of the holes is based on the density of the resin and the surface tension of the resin.

25. The system as set forth in claim 16 wherein the containment layer comprises a meltable substance that is applied to a porous veil material.

26. The system as set forth in claim 17 wherein the layer of perforated heat shrinkable material such as Intercept Shrink film manufactured by FPM, Incorporated.

27. The system as set forth in claim 15 wherein the vacuum outlet port is positioned between the outer sheet and the mold surface.

28. The system as set forth in claim 15 wherein the vacuum outlet port extends through the mold surface.

29. A system for controlling the flow of a substance comprising:
means for introducing the substance into a distribution medium, wherein the distribution medium is positioned adjacent to a containment layer and the containment layer is configured to substantially prevent the substance from flowing from the distribution medium until the substance distribution medium is substantially filled with substance; and the containment layer is reconfigurable under at least one of the group of: vacuum force, atmospheric pressure, and temperature to allow the substance to flow to an intended destination.

30. The system as set forth in claim 29 further comprising means for varying the pressure on the substance after introducing the substance into the distribution medium.

31. The system as set forth in claim 29, further comprising means for heating the containment layer.

32. The system as set forth in claim 31, wherein the containment layer is heated by the substance.

33. The system as set forth in claim 31, further comprising means for applying pressure to the substance to rupture the containment layer.

34. The system as set forth in claim 29, wherein the containment layer is dissolvable.

35. The system as set forth in claim 29, wherein the containment layer is meltable.

36. The system as set forth in claim 29, wherein the containment layer is shrinkable.

37. The system as set forth in claim 29 further comprising a peel ply layer placed adjacent to the intended destination of the substance.

* * * * *